United States Patent
Inoue et al.

(10) Patent No.: US 7,839,088 B2
(45) Date of Patent: Nov. 23, 2010

(54) GLASS COMPOSITION AND DISPLAY PANEL USING THE SAME

(75) Inventors: Osamu Inoue, Osaka (JP); Shinya Hasegawa, Osaka (JP); Yasuhiko Nakada, Osaka (JP); Tsutomu Koshizuka, Osaka (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 11/858,598

(22) Filed: Sep. 20, 2007

(65) Prior Publication Data

US 2008/0018252 A1 Jan. 24, 2008

Related U.S. Application Data

(63) Continuation of application No. PCT/JP2007/056085, filed on Mar. 23, 2007.

(30) Foreign Application Priority Data

Mar. 31, 2006 (JP) .............................. 2006-098815

(51) Int. Cl.
*H01J 17/49* (2006.01)
*C03C 3/072* (2006.01)

(52) U.S. Cl. ............................ 313/586; 501/69; 501/75

(58) Field of Classification Search ................. 313/586; 501/69, 72, 75–76
See application file for complete search history.

(56) References Cited

U.S. PATENT DOCUMENTS 6,215,246 B1 * 4/2001 Kim et al. .................... 313/584
6,232,717 B1 * 5/2001 Oida et al. ................... 313/586
6,242,860 B1 * 6/2001 Sasao et al. ................. 313/586
6,297,590 B1 * 10/2001 Nanto et al. ................. 313/586
6,897,610 B1 * 5/2005 Aoki et al. ................... 313/586
2003/0228471 A1 * 12/2003 Hayakawa et al. .......... 428/426

FOREIGN PATENT DOCUMENTS

| JP | 7-257938 | 10/1995 |
|---|---|---|
| JP | 07257938 A * | 10/1995 |
| JP | 9-278482 | 10/1997 |
| JP | 11-086736 | 3/1999 |
| JP | 11-260253 | 9/1999 |
| JP | 2000-313635 | 11/2000 |
| JP | 2001-139345 | 5/2001 |
| JP | 2001-163635 | 6/2001 |
| JP | 2001172046 A * | 6/2001 |
| JP | 2002-274883 | 9/2002 |
| JP | 2003-128430 | 5/2003 |
| JP | 2005-231989 | 9/2005 |
| JP | 2005-343730 | 12/2005 |
| JP | 2006-032044 | 2/2006 |

* cited by examiner

*Primary Examiner*—Karabi Guharay
(74) *Attorney, Agent, or Firm*—Hamre, Schumann, Mueller & Larson, P.C.

(57) ABSTRACT

A glass composition of the present invention is oxide glass and has a composition that satisfies: 60 wt %<$B_2O_3$<78 wt %, 15 wt %<ZnO≦24 wt %, 6 wt %≦$R_2O$≦16 wt %, 1 wt %≦MO<17 wt %, and 0 wt %≦$SiO_2$≦10 wt %, where R denotes at least one selected from Li, Na, and K, and M indicates at least one selected from Mg, Ca, Sr, and Ba. A display panel of the present invention is formed using such a glass composition of the present invention.

8 Claims, 4 Drawing Sheets

GLASS COMPOSITION AND DISPLAY PANEL USING THE SAME

This application is a continuation of international application number PCT/JP2007/056085, filed Mar. 23, 2007, pending.

BACKGROUND OF THE INVENTION

1. Field of the Invention

The present invention relates to glass compositions suitable for covering electrodes, and display panels, particularly plasma display panels, using the same.

2. Related Background Art

In displays and integrated circuits such as plasma display panels (hereinafter abbreviated as "PDP"), field emission displays, liquid crystal displays, fluorescent displays, ceramic laminated devices, and hybrid integrated circuits, substrates are used that have electrodes and wirings formed of, for example, Ag or Cu on the surfaces thereof. Such electrodes and wirings may be covered with insulating glass materials to be protected. A PDP, which is a typical display, is described below using an example.

Generally, a PDP is configured to include two opposing glass substrates, each of which is provided with electrodes arranged regularly, with gas that mainly contains inactive gas, such as Ne or Xe, being sealed therebetween. In the PDP, voltage is applied between electrodes to cause electric discharge in minute cells located around the electrodes and to allow each cell to emit light, resulting in a display. These electrodes are covered with an insulating material called a dielectric layer to be protected.

For instance, in a glass substrate to serve as the front plate of an AC type PDP, transparent electrodes are formed and electrodes of metal, such as Ag, Cu, or Al, with lower resistivity are formed further thereon. A dielectric layer is formed covering those combined electrodes, and a protective layer (MgO layer) is formed further thereon.

The dielectric layer to be formed covering the electrodes can be a thin film of, for example, $SiO_2$ formed by a method such as CVD (chemical vapor deposition). Usually, however, from the viewpoints of equipment and cost, glass with a low softening point is used. The dielectric layer made using such glass with a low softening point is formed by applying a paste containing glass powder to cover electrodes by, for instance, a screen printing method or a die coating method, and then baking it.

The characteristics required of a glass composition that forms a dielectric layer include, for example:

(1) having insulation properties because it is formed on electrodes;

(2) having a thermal expansion coefficient that is not greatly different from that of the substrate material so as to prevent the glass substrate from warping and the dielectric layer from peeling off and cracking in the case of a large-area panel;

(3) being amorphous glass with a high visible light transmittance so as to utilize the light generated from phosphors as display light efficiently when being used for a front panel; and (4) having a lower softening point so as to conform to the heat resistance of substrate glass.

Examples of the glass substrate to be used for a PDP include soda lime glass, which is window sheet glass that is produced by a float process and generally is easily available, and glass with a high strain point developed for PDPs. They usually have a heat resistance up to 600° C. and a thermal expansion coefficient of $75 \times 10^{-7}$ to $85 \times 10^{-7}/°$ C.

Accordingly, with respect to the item (2) described above, the glass composition has desirably a thermal expansion coefficient of about $70 \times 10^{-7}/°$ C. to $90 \times 10^{-7}/°$ C. With respect to the item (4) described above, since it is necessary to bake the glass paste below 600° C., which is the strain point of the glass substrate, the glass composition desirably has a softening point of about 590° C. or lower so as to be softened enough even if the glass paste is baked at a temperature of 600° C. or lower.

Currently, $PbO$—$SiO_2$ glass whose main raw material is PbO is used mainly as a glass material that satisfies the requirements as described above.

However, environmental concerns in recent years require dielectric layers that are free from Pb. Furthermore, glass materials are required to have further lower permittivity in order to reduce the power consumption of PDPs. For example, a $Bi_2O_3$—$B_2O_3$—$ZnO$—$SiO_2$ glass material (see, for example, JP 2001-139345 A) having a lower softening point achieved by providing zinc borate as a main component and Bi instead of Pb has been developed as glass that is free from Pb. However, like the Pb material, the Bi material also has a problem in that its relative permittivity is as high as about 9 to 13.

Therefore, a material that attained a relative permittivity of around 7 also is proposed using the zinc borate glass (alkali metal oxide-$B_2O_3$—$ZnO$—$SiO_2$ glass) containing alkali metal instead of Pb in order to obtain both a low permittivity and a low softening point (see, for example, JP 9(1997)-278482 A, JP 2000-313635 A, and JP 2002-274883 A).

However, although the desirable relative permittivity is preferably as low as possible, glass with a relative permittivity of 6.5 or lower and a low softening point had not been found. Furthermore, the alkali zinc borate glass that has been studied conventionally can satisfy the low softening point and suitable thermal expansion coefficient but it has been difficult to obtain glass with a high glass transition temperature (glass transition point) in addition to the low softening point and suitable thermal expansion coefficient.

If the glass to be obtained is one for covering electrodes simply, it is enough to allow it to have a low softening point, a suitable thermal expansion coefficient, and a low permittivity. However, in the case of PDPs, after electrodes are covered with glass, the glass layer is heated again at a temperature of nearly 500° C. in, for example, the step of annealing an MgO layer and the sealing step of bonding a front panel and a rear panel to each other. Since the softening point of the glass for a dielectric layer is a little lower than 600° C., it will not necessarily be softened even if it is heated at a temperature of about 500° C. However, if this heating temperature exceeds the glass transition temperature considerably, the physical properties of the glass will change rapidly. Accordingly, especially, in large area displays, a dielectric layer will separate from a substrate or will crack, which results in a decrease in insulation and reliability. According to the studies made by the inventor, in order to reheat-treat the glass at about 500° C., the desirable glass transition point required of the glass is at least 475° C. Moreover, for example, in displays other than PDPs and circuit boards, when electrodes and wirings are covered with a glass material and thereafter the glass material is heat-treated at a high temperature again, there was a risk of similar problems arising.

According to the studies of the inventor, in order to allow alkali zinc borate glass to have a low permittivity, it is necessary to increase the amount of $B_2O_3$, but an increase in the amount of $B_2O_3$ tends to lower the glass transition point. In the conventional glass for covering electrodes, attention was not paid to the glass transition point at all. Accordingly, although the material with a low softening point, a low permittivity, and a suitable thermal expansion coefficient is obtained, no material that also has a high glass transition point in addition to them has been obtained.

Furthermore, in alkali glass with a large content of $B_2O_3$, since $B_2O_3$ dissolves in water easily, there was a problem that it has low water resistance/high hygroscopicity. Low water resistance may result in insulation failure from exposure of the glass of which a dielectric layer is formed to water during cutting of the substrate. On the other hand, the high hygroscopicity may increase the amount of moisture in the system (in the dielectric layer), deteriorating the properties of the MgO protective film formed on the dielectric layer.

SUMMARY OF THE INVENTION

The present invention is intended to provide a glass composition and a display panel using the same. The glass composition has a low softening point, a low permittivity, and a thermal expansion coefficient that matches well with that of a substrate to be used for a display panel. Furthermore, the glass composition has a high glass transition point and a high water resistance, and allows a highly reliable display panel to be produced.

The glass composition of the present invention is oxide glass and has a composition that satisfies:
60 wt %<$B_2O_3$<78 wt %,
15 wt %<$ZnO$≦24 wt %,
6 wt %≦$R_2O$≦16 wt %,
1 wt %≦$MO$<17 wt %, and
0 wt %≦$SiO_2$≦15 wt %, where R indicates at least one selected from Li, Na, and K, and M denotes at least one selected from Mg, Ca, Sr, and Ba. That is, in the glass composition of the present invention, the total amount of $Li_2O$, $Na_2O$, and $K_2O$ is between 6 wt % and 16 wt %, and the total amount of MgO, CaO, SrO, and BaO is at least 1 wt % but less than 17 wt %.

The present invention can provide a glass composition that has a low softening point, a low permittivity, a thermal expansion coefficient that matches well with that of a substrate to be used for a display panel, a high glass transition point, and a high water resistance, and makes it possible to produce a highly reliable display panel.

Moreover, the present invention provides a display panel produced using the above-mentioned glass composition according to the present invention.

A first display panel of the present invention is a display panel in which electrodes are covered with a dielectric layer containing a glass composition, wherein the glass composition is the above-mentioned glass composition of the present invention.

A second display panel of the present invention is a display panel in which electrodes are covered with a dielectric layer containing a glass composition, wherein the dielectric layer includes a first dielectric layer that directly covers the electrodes and a second dielectric layer disposed on the first dielectric layer, the glass composition contained in the first dielectric layer is substantially free from alkali metal elements, and the glass composition contained in the second dielectric layer is the above-mentioned glass composition of the present invention.

A third display panel of the present invention is a plasma display panel including a front panel provided with a first electrode, a rear panel that has a second electrode provided to cross the first electrode and that is disposed to oppose the front panel, a dielectric layer that covers at least one selected from the first electrode and the second electrode, and barrier ribs disposed between the front panel and the rear panel to form a discharge space, wherein at least one selected from the dielectric layer and the barrier ribs contains the above-mentioned glass composition of the present invention.

A fourth display panel of the present invention includes a first dielectric layer disposed on a substrate, an electrode disposed on the first dielectric layer, and a second dielectric layer disposed on the electrode, wherein the first dielectric layer contains the above-mentioned glass composition of the present invention.

With the first to fourth display panels of the present invention, highly reliable display panels can be provided.

DETAILED DESCRIPTION OF THE INVENTION

As a result of detailed studies, the present inventor found out that it was possible to obtain a glass composition having a considerably low permittivity while having a low softening point, thermal expansion coefficient that matches well with that of a substrate, sufficiently high glass transition point, high water resistance, and no disadvantages of the conventional zinc borate glass containing alkali metal, within the composition range in the glass composition of the present invention as described above.

According to the present invention, it is possible to obtain a glass composition with a softening point of 590° C. or lower, a glass transition point of at least 475° C., a thermal expansion coefficient (an average linear thermal expansion coefficient) of $70 \times 10^{-7}/°$ C. to $90 \times 10^{-7}/°$ C., and a relative permittivity of 6.5 or lower.

<Glass Composition>

Hereinafter, the reasons for limiting each component in the glass composition of the present invention are described.

$B_2O_3$ is a main component of the glass composition according to the present invention. With the increase in the amount of $B_2O_3$, the permittivity decreases, the softening point is lowered, and the glass transition point also is lowered. The considerable temperature decrease in glass transition point rather than the temperature decrease in softening point is particularly a problem. As described above, it is desirable that the softening point be 590° C. or lower and the glass transition point be at least 475° C. Accordingly, although the difference between the softening point and the glass transition point is desirably 115° C. or smaller, it increases with the increase in the amount of $B_2O_3$. The reason for limiting the amount of $B_2O_3$ to more than 60 wt % but less than 78 wt % is as follows. That is, the permittivity becomes high or the softening point becomes high when the amount of $B_2O_3$ is 60 wt % or less, and the glass transition point becomes too low when the amount of $B_2O_3$ is 78 wt % or more.

$R_2O$ (R=Li, Na, K), which is an alkali metal oxide, is an essential component of the glass composition according to the present invention. The increase in the amount of alkali metal oxide is effective in reducing the difference between the softening point and the glass transition point but results in an increase in permittivity and tends to cause yellowing described later. The reason for limiting the total amount of ($K_2O+Na_2O+Li_2O$) to from 6 wt % to 16 wt % is as follows. That is, when it is less than 6 wt %, the softening point increases and the thermal expansion coefficient becomes too small, while when it exceeds 16 wt %, the permittivity and the thermal expansion coefficient become too high.

When the same amounts of different types of alkali metal oxides are compared to one another, $K_2O$, $Na_2O$, and $Li_2O$ tend to cause yellowing in this order. When the same amounts of them are compared to one another, $K_2O$ has the highest thermal expansion coefficient, and $Na_2O$ and $Li_2O$ have decreasing thermal expansion coefficients in this order. The increase in the amount of the alkali metal oxides tends to cause yellowing. It therefore is desirable to reduce the amount as much as possible. However, when the amount is reduced excessively, the thermal expansion coefficient becomes excessively low. In this case, $K_2O$ allows a suitable thermal expansion coefficient to be obtained in a smaller amount, followed by $Na_2O$. In the case of $Li_2O$, it is difficult to reduce the amount. Accordingly, among the alkali metal oxides, $K_2O$ is most preferable, followed by $Na_2O$. In the glass composition of the present invention, it is more preferable that $K_2O$ alone be used, or $K_2O$ and $Na_2O$ be used, with the amount of $K_2O$ being at least twice that of $Na_2O$.

An alkaline-earth metal oxide, MO (M=Mg, Ca, Sr, Ba), is an essential component of the glass composition according to the present invention. Since the glass composition of the present invention contains a large amount of $B_2O_3$ (in the range of composition with a large amount of B), the glass transition point is lowered and the difference between the softening point and the glass transition point also tends to increase. However, when a small amount of at least one selected from MgO, CaO, SrO, and BaO is added, the softening point itself increases and further the glass transition point also increases more than that. Accordingly, it has an effect of increasing the glass transition point as well as reducing the temperature difference between the glass transition point and the softening point. The similar effect also is seen in the case of ZnO as described later, but the alkaline-earth metal oxide has a greater effect of increasing the glass transition point. Furthermore, in adding ZnO, a problem arises in that the crystallization temperature decreases due to the increase in the amount of ZnO to be added, but no problem in crystallization is caused by addition of alkaline-earth metal oxides. Furthermore, when ZnO and alkaline-earth metal oxide are added together, the problem in crystallization caused by the addition of ZnO can be avoided. Moreover, addition of alkaline-earth metal oxide also has an effect of improving the water resistance of glass although it is not as effective as ZnO. Accordingly, in order to allow the glass with a low permittivity in the range of composition with a large amount of B to be a practical material as in the present invention, it is essential to add an alkaline-earth metal oxide. The reason for limiting the amount thereof to less than 17 wt % is because a larger amount than that results in a high softening point and an excessively high permittivity.

When the same amounts of different types of alkaline-earth metal oxides are compared to one another, CaO is most effective in increasing the glass transition point and reducing the difference between the softening point and the glass transition point, and BaO allows the permittivity to be the highest, and subsequently SrO, CaO, and MgO provide decreasing permittivity in this order. Accordingly, among them, CaO is most preferable and BaO is least preferable.

$SiO_2$ is not an essential element of the glass composition according to the present invention. $SiO_2$ is effective in improving the chemical stability of glass and increasing the glass transition point. However, the softening point is allowed to increase more than the increase in the glass transition point, which results in an increase in the difference between the softening point and the glass transition point. Therefore no $SiO_2$ may be contained, but $SiO_2$ can be contained in a small amount, for example, for improving the chemical stability and adjusting the thermal expansion coefficient. The reason for setting the upper limit thereof to 10 wt % or less is as follows. That is, when it exceeds 10 wt %, the softening point will become excessively high and the difference between the softening point and the glass transition point will become excessively large, and the thermal expansion coefficient will be lower than $70 \times 10^{-7}/°C$.

ZnO is an essential component of the glass composition according to the present invention. Although addition of ZnO increases slightly the permittivity, the softening point, and the glass transition point, the effect is less than that provided by the alkaline-earth metal oxide when they are compared to each other in the same amount. However, since it causes the increase in the softening point that is less than that in the glass transition point, and is less effective in increasing the permittivity and the softening point, it can be used in a relatively large amount. As a result, it is more effective in reducing the difference between the softening point and the glass transition point as compared to the alkaline-earth metal oxide. Furthermore, addition of ZnO is effective in improving the water resistance even when it is used in a small amount. The reason for limiting the amount thereof to more than 15 wt % is because an amount of 15 wt % or less is less effective in approximating the softening point and the glass transition point. The reason for limiting the amount thereof to 24 wt % or less is because an amount exceeding the 24 wt % results in an excessively high softening point.

The glass composition of the present invention contains the above-mentioned components and typically is composed substantially only of the above-mentioned components (in other words, substantially may not contain any components other than those described above) but can contain other components, as long as the effects of the present invention can be obtained. The sum of the contents of other components is preferably 5 wt % or less, more preferably 3 wt % or less, and further preferably 1 wt % or less.

Specific examples of other components include oxides of rare earth metals such as yttrium (Y) and lanthanum (La) as well as oxides of bismuth (Bi), vanadium (V), antimony (Sb), phosphorus (P), molybdenum (Mo), tungsten (W), titanium (Ti), cobalt (Co), and copper (Cu). The oxides of rare earth metals such as yttrium (Y) and lanthanum (La) increase the glass transition point by about 10 to 20° C., but they also increase the softening point to a comparable degree. Accordingly, when both the glass transition point and the softening point are low in the basic composition of the glass composition according to the present invention, it is advantageous to add a rare earth metal element to increase those temperatures. Oxides of bismuth (Bi), vanadium (V), antimony (Sb), and phosphorus (P) lower the glass transition point by about 10 to 20° C. but also lower the softening point to a comparable degree. Accordingly, when both the glass transition temperature and the softening point are high in the basic composition of the glass composition according to the present invention, it is advantageous to add the oxides to decrease those temperatures. Addition of bismuth (Bi) also is effective in improving the water resistance of glass. The oxides of molybdenum (Mo) and tungsten (W) have the effect of preventing yellowing from occurring. Since the oxides of titanium (Ti), cobalt (Co), and copper (Cu) color glass blue, strengthening the color of blue, which is a complementary color, can prevent the color balance from being disrupted when yellowing occurs. The desirable upper limit of the amounts of these additives is preferably 5 wt % or less, more preferably 3 wt % or less, and further preferably 1 wt % or less as described above. However, this is because when it exceeds 5 wt %, the glass is colored heavily and has a higher permittivity, and the material cost increases.

Besides them, oxides of, for example, aluminum (Al), zirconium (Zr), manganese (Mn), niobium (Nb), tantalum (Ta), tellurium (Te), and silver (Ag) can be added to adjust the thermal expansion coefficient, stabilize the glass, and improve the chemical durability, if they are used in a small amount. The sum of the contents thereof also is preferably 5 wt % or less, more preferably 3 wt % or less, and further preferably 1 wt % or less.

In the glass composition of the present invention, the relative ratio of respective oxides of $B_2O_3$, ZnO, $R_2O$, MO, and $SiO_2$ that are contained as composition components is most important. Therefore, in the case where a component other than those, for example, $Al_2O_3$ is contained in an amount of 3 wt %, when the rest, 97 wt %, obtained by subtracting the amount of 3 wt % is expressed as 100 wt %, the weight ratio of the respective components should satisfy that of the respective oxides in the glass composition of the present invention.

As the glass composition of the present invention, for example, a $B_2O_3$—ZnO—$K_2O$—CaO-based glass composition and a $B_2O_3$—ZnO—$K_2O$—CaO—$SiO_2$-based glass composition can be used.

Preferably, the glass composition of the present invention is substantially free from lead oxide (PbO). This is because the addition of lead oxide can cause problems such as the influence on the environment, increase in permittivity, coloring of glass, and increase in material cost.

Alkali-containing glass with a low permittivity like the glass composition of the present invention contains alkali metal as a component thereof. Accordingly, when the alkali-containing glass is used as a dielectric material for protecting electrodes containing Ag or Cu, the Ag or Cu is oxidized to be ionized, and those ions diffuse in the glass, depending on the conditions for baking. The Ag or Cu ions are reduced again and deposited as colloidal metal, which causes so-called yellowing where a dielectric layer and a glass substrate appear to be colored yellow. Therefore, the glass composition that is substantially free from alkali metal can be used for the first dielectric layer that is brought into direct contact with electrodes (that directly covers electrodes) and the glass composition of the present invention can be used for the second dielectric layer to be stacked thereon in order to prevent from yellowing while the permittivity as a whole is kept low.

In this specification, the phrase "substantially free" denotes that a trace amount of component that is industrially difficult to remove and that does not affect the properties is tolerated. Specifically, it denotes that the content is 1 wt % or less, more preferably 0.1 wt % or less.

<Configuration of PDP>

Figure 1:
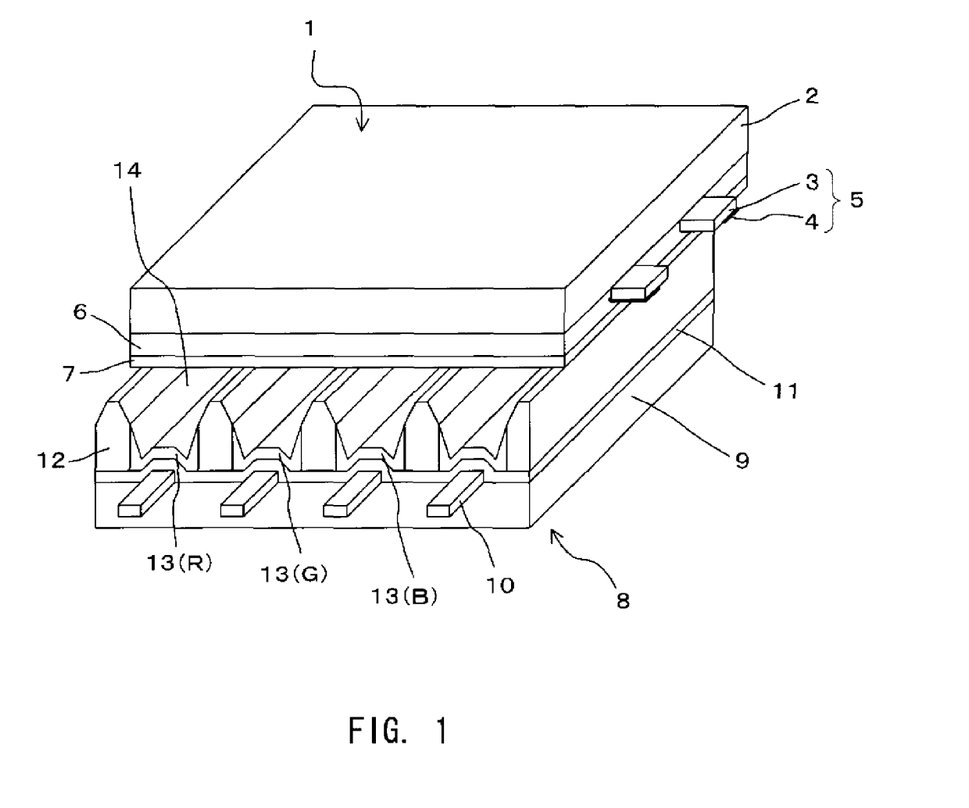
FIG. 1 is a partially cutaway perspective view showing an example of the configuration of a PDP according to the present invention.
Figure 2:
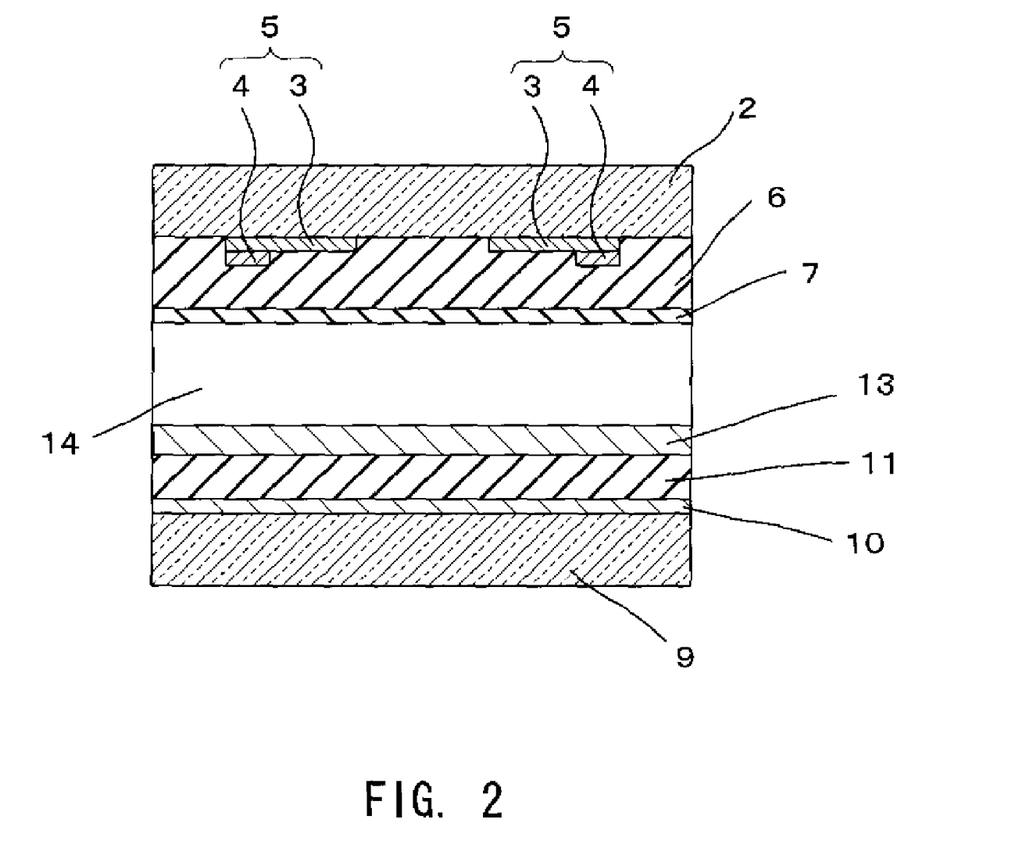
FIG. 2 is a cross-sectional view of the PDP shown in FIG. 1.

A PDP is described as a specific example of the display panel according to the present invention. FIG. 1 is a partially cutaway perspective view showing the main configuration of the PDP according to this embodiment. FIG. 2 is a cross-sectional view of the PDP. This PDP is of an AC plane discharge type and has the similar configuration to those of PDPs according to conventional examples except that the dielectric layer is formed of the glass composition described above.

This PDP is formed with a front panel 1 and a rear panel 8 that are bonded to each other. The front panel 1 includes a front glass substrate 2, display electrodes (first electrodes) 5, each of which is composed of a transparent electrode 3 formed on the inner surface (the surface facing discharge spaces 14) of the front glass substrate 2 and a bus electrode 4, a dielectric layer 6 formed to cover the display electrodes 5, and a dielectric protective layer 7 made of magnesium oxide formed on the dielectric layer 6. The display electrodes 5 each are formed with the bus electrode 4 made of, for example, Ag being stacked on the transparent electrode 3 made of ITO (Indium Tin Oxide) or tin oxide in order to ensure good conductivity.

The rear panel 8 includes a rear glass substrate 9, address electrodes (second electrodes) 10 formed on one surface thereof, a dielectric layer 11 formed to cover the address electrodes 10, barrier ribs 12 that are provided on the upper surface of the dielectric layer 11, and phosphor layers 13 formed between the barrier ribs 12 adjacent to each other. The phosphor layers 13 are formed so that a red phosphor layer 13(R), a green phosphor layer 13(G), and a blue phosphor layer 13(B) are arranged in this order.

Figure 4:
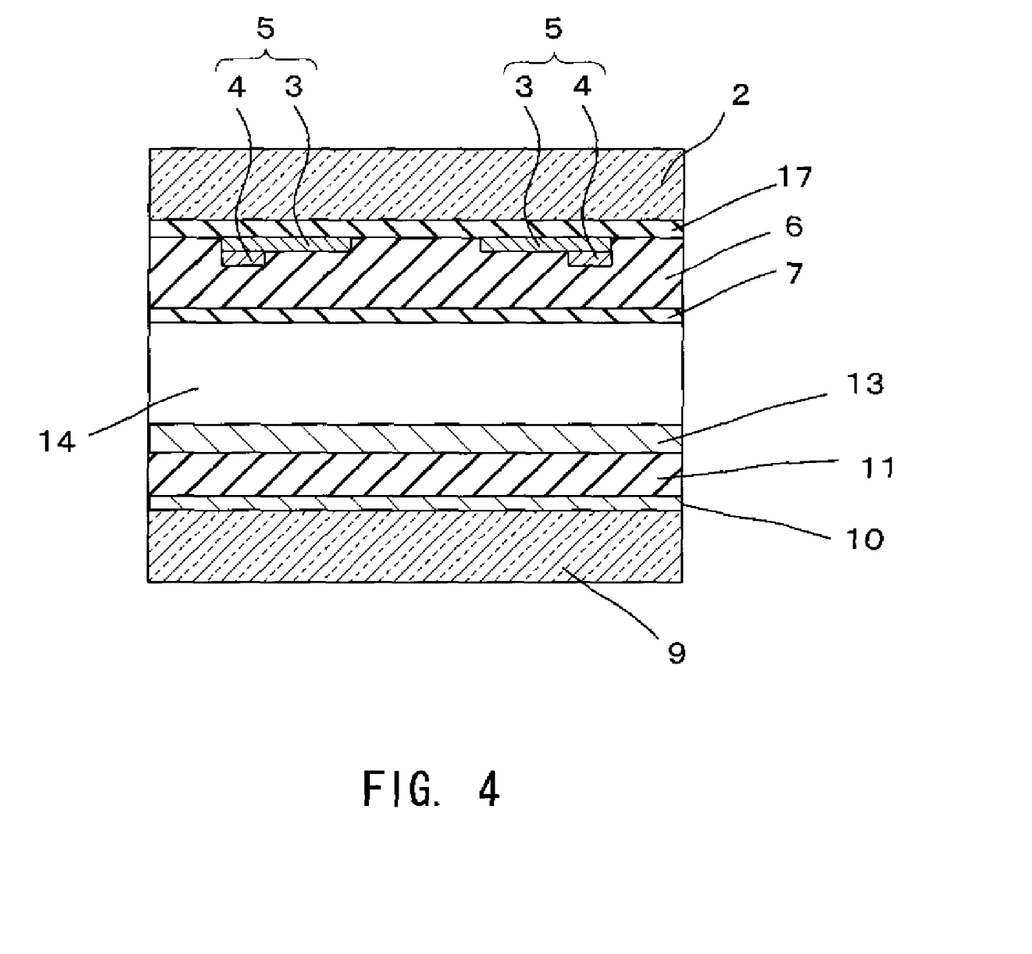
FIG. 4 is a cross-sectional view showing still another example of the configuration of a PDP according to the present invention.

The glass composition of the present invention described above is used for the dielectric layer 6 and/or the dielectric layer 11, and preferably for the dielectric layer 6. Further, the glass composition of the present invention can be used for the barrier ribs 12. The dielectric layer 6 needs to be transparent, but the dielectric layer 11 and the barrier ribs 12 do not need to be transparent. Therefore, when using the glass composition of the present invention for the dielectric layer 11 or the barrier ribs 12, one can include, for example, $SiO_2$ particles with a lower permittivity dispersed therein as a filler. Furthermore, as shown in FIG. 4, when a dielectric layer 17 containing the glass composition of the present invention is formed between the glass substrate 2 and the display electrodes 5 or between the glass substrate 9 and the address electrodes 10, the influence of the permittivity of the substrate glass can be reduced. FIG. 4 shows an example provided with the dielectric layer 17 between the glass substrate 2 and the display electrodes 5, and the identical members (films) as those of the PDP shown in FIG. 1 are indicated with the identical numerals. In the case of the configuration (the configuration where the dielectric layer is disposed between the substrate and electrodes) shown in FIG. 4, the dielectric layer 17 corresponds to the first dielectric layer, and the dielectric layer 6 corresponds to the second dielectric layer.

The case where the glass composition of the present invention was used for the dielectric layer 6 is explained below as an example. However, since the glass composition of the present invention can achieve a low permittivity, a low softening point, a high glass transition point, and a suitable thermal expansion coefficient, it also can be used suitably for the dielectric layer 11, the barrier ribs 12, or the dielectric layer 17 disposed between the substrate and the electrodes.

For the phosphors of the phosphor layers 13, $BaMgAl_{10}O_{17}$:Eu can be used as a blue phosphor, $Zn_2SiO_4$:Mn can be used as a green phosphor and $Y_2O_3$:Eu can be used as a red phosphor, for example.

The front panel 1 and the rear panel 8 are disposed so that the display electrodes 5 and the address electrodes 10 are orthogonal to each other in their longitudinal directions and so as to oppose each other, and are joined with a sealing member (not shown).

A discharge gas (filler gas) composed of rare gas components, such as He, Xe, and Ne, is sealed in the discharge spaces 14 at a pressure of about 66.5 to 79.8 kPa (500 to 600 Torr).

The display electrodes 5 and the address electrodes 10 each are connected to an external drive circuit (not shown), voltage applied from the drive circuit causes discharges in the discharge spaces 14, and the phosphor layers 13 are excited by ultraviolet rays with a short wavelength (a wavelength of 147 nm) generated according to the discharges to emit visible light.

The dielectric layer 6 is formed usually by adding, for example, a binder and a solvent for providing printing properties to glass powder to obtain a glass paste, applying the glass paste onto electrodes formed on the glass substrate, and baking it.

The glass paste contains the glass powder, the solvent, and the resin (binder), but it also can contain components other than those, for example, additives according to various purposes, such as a surfactant, a development accelerator, an adhesive auxiliary, an antihalation agent, a preservation stabilizer, an antifoaming agent, an antioxidant, an ultraviolet absorber, a pigment, and a dye.

Since the resin (binder) contained in the glass paste can be any one as long as it has low reactivity with raw material powder (glass powder), the type thereof is not particularly limited. From the viewpoints of, for example, chemical stability cost, and safety, at least one selected from, for example, cellulose derivatives such as nitrocellulose, methylcellulose, ethylcellulose, and carboxymethyl cellulose, polyvinyl alcohol, polyvinyl butyral, polyethylene glycol, carbonate resin, urethane resin, acrylic resin, and melamine resin can be used as a binder.

Since the solvent contained in the glass paste can be any one as long as it has low reactivity with raw material powder, the type thereof is not particularly limited. From the viewpoints of, for example, chemical stability, cost, and safety as well as the viewpoint of compatibility with the binder, the solvent to be used can be an organic solvent such as, for example, ethylene glycol monoalkyl ethers, ethylene glycol monoalkyl ether acetates, diethylene glycol dialkyl ethers, propylene glycol monoalkyl ethers, propylene glycol dialkyl ethers, propylene glycol alkyl ether acetates, esters of aliphatic carboxylic acid, and alcohols such as terpineol and benzyl alcohol.

A typical method of forming the dielectric layer 6 using the glass composition of the present invention is a method of applying the above-mentioned glass paste by, for example, a screen method, a bar coater, a roll coater, a die coater, or a doctor blade, and baking it. However, the method is not limited thereto. The dielectric layer 6 can be formed also by, for example, the method of attaching a sheet containing the above-mentioned glass composition and baking it.

Preferably, the dielectric layer 6 has a thickness of approximately 10 μm to 50 μm in order to obtain both insulation properties and optical transparency.

Figure 3:
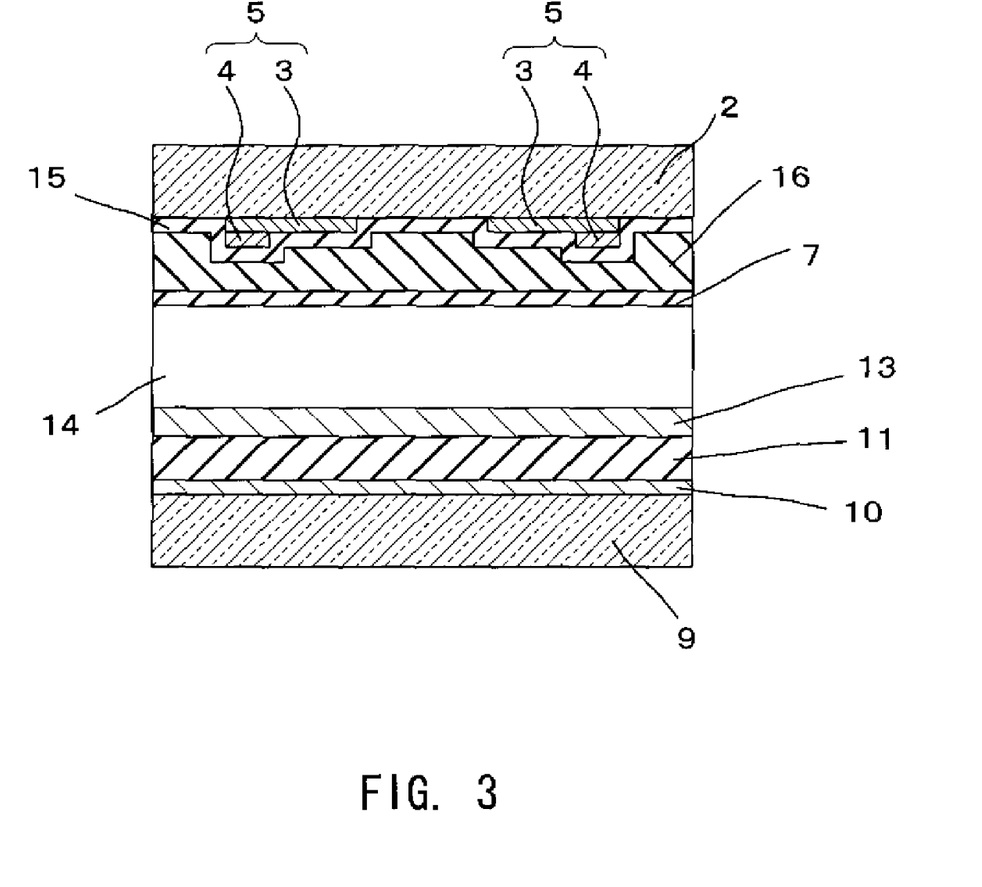
FIG. 3 is a cross-sectional view showing another example of the configuration of a PDP according to the present invention.

Next, a specific example of the PDP with a dielectric layer having a two-layer structure is described with reference to FIG. 3. FIG. 3 is a cross-sectional view of a PDP in which the dielectric layer of the front panel has a two-layer structure, and the PDP is identical to the PDP shown in FIG. 2 except that the dielectric layer having a two-layer structure including a first dielectric layer 15 and a second dielectric layer 16 is used instead of the dielectric layer 6 (identical members (films) to those shown in FIG. 2 are indicated with the same numerals and descriptions thereof are omitted).

As shown in FIG. 3, the first dielectric layer 15 and the second dielectric layer 16 are disposed to cover the display electrodes 5 and the first dielectric layer 15, respectively. In this manner, when the dielectric layer has a two-layer structure, it is preferable that the glass composition of the present invention be used for the glass composition contained in the second dielectric layer 16 and a glass composition that is substantially free from alkali metal be used for the glass composition contained in the first dielectric layer 15. With such configuration, since the first dielectric layer 15 that is in direct contact with the display electrodes 5 is substantially free from alkali metal elements, at least the first dielectric layer 15 can be prevented from yellowing due to the colloid deposition of Ag or Cu and having a reduced withstand voltage. Furthermore, since Ag or Cu ions are prevented from diffusing with the first dielectric layer 15, the second dielectric layer 16 also can be protected from discoloring or having a reduced withstand voltage.

The glass composition of the present invention makes it possible to provide a glass composition with a relative permittivity of 6.5 or lower. When this glass composition is used for the second dielectric layer 16, even if a material with a somewhat high permittivity is used for the first dielectric layer 15, a dielectric layer having a low permittivity as a whole can be formed. Considering that the relative permittivity of conventional Pb glass or Bi glass is 9 to 13, power consumption can be reduced even in the case where a two-layer structure as described above is employed.

The above-mentioned dielectric layer having a two-layer structure can be formed by forming the first dielectric layer 15, then applying the glass composition for the second dielectric layer 16, and baking it. When a glass composition is used for the first dielectric layer 15, it is preferable that the glass composition concerned has a higher softening point than that of the glass composition contained in the second dielectric layer 16.

In order to secure the insulation between the display electrodes 5 and the second dielectric layer 16 and the prevention of the interface reaction, it is preferable that the first dielectric layer 15 have a thickness of at least 1 μm.

In order to obtain both the insulation properties and transmittance, it is preferable that the sum of the thicknesses of the first dielectric layer 15 and the second dielectric layer 16 be about 10 μm to 50 μm.

<Method of Producing PDP>

A method of producing the above-mentioned PDP (the PDP shown in FIGS. 1 and 2) is described using an example. First, the front panel 1 is produced. A plurality of linear transparent electrodes 3 made of ITO or tin oxide are formed on one principal surface of the flat front glass substrate 2. Subsequently, a silver paste is applied onto the transparent electrodes 3 and then is baked by heating the whole front glass substrate 2, and thereby bus electrodes 4 are formed. Thus, the display electrodes 5, each of which is composed of a transparent electrode 3 and a bus electrode 4, are formed.

A glass paste (a glass paste containing the glass composition of the present invention in the case of this embodiment) for the dielectric layer of the PDP according to the present invention is applied to the above-mentioned principal surface of the front glass substrate 2 by the blade coater method so as to cover the display electrodes 5. Thereafter, the whole front glass substrate 2 is maintained at 90° C. for 30 minutes and thereby the glass paste is dried. Subsequently, it is baked at a temperature of around 580° C. for 10 minutes. Thus the dielectric layer 6 is produced.

A film of magnesium oxide (MgO) is formed on the dielectric layer 6 by an electron beam vapor deposition method and then is baked at a temperature around 500° C. Thus the dielectric protective layer 7 is formed.

When a PDP with a dielectric layer having a two-layer structure as shown in FIG. 3 is to be produced, using a glass paste for the first dielectric layer 15, the first dielectric layer 15 is formed to cover the display electrodes 5 as in the above, a glass paste (a glass paste containing the glass composition of the present invention in the case of this embodiment) for the second dielectric layer 16 is applied onto the first dielectric layer 15, is dried, and then is baked, and thereby the second dielectric layer 16 is formed.

Next, the rear panel 8 is produced. After a silver paste is applied to one principal surface of the flat rear glass substrate 9 in the form of a plurality of lines, the whole rear glass substrate 9 is heated and thereby the silver paste is baked. Thus the address electrodes 10 are formed. Next, the dielectric layer 11 is formed on the rear glass substrate 9 with the address electrodes 10 formed thereon.

Subsequently, a glass paste is applied between adjacent address electrodes 10, the whole rear glass substrate 9 is heated, and thereby the glass paste concerned is baked. Thus barrier ribs 12 are formed.

Phosphor inks with respective R, G, and B colors are applied between adjacent barrier ribs 12, the rear glass substrate 9 is heated to about 500° C., and thereby the above-mentioned phosphor inks are baked, so that, for example, a resin component (binder) in the phosphor inks is removed. Thus phosphor layers 13 are formed.

The front panel 1 and the rear panel 8 thus obtained are bonded to each other using sealing glass at a temperature around 500° C. Then, the sealed inner part is subjected to high vacuum exhaust, and then rare gas is sealed therein. Thus the PDP is obtained.

The above-mentioned PDP and the method of producing it are examples and the present invention is not limited thereto. As described above, however, the dielectric layer is subjected to heat treatments at about 500° C. in baking the MgO layer and sealing the front panel and the rear panel in addition to the baking of the dielectric layer itself although each heat treatment is carried out for a short time. In this case, when the dielectric layer has an excessively low glass transition point, the thermal expansion coefficient increases in the temperature range beyond the glass transition point, and therefore the dielectric layer may be cracked or separated and thus cannot be used. According to the studies made by the inventor, the glass composition contained in the dielectric layer has desirably a glass transition point of at least 475° C., more desirably at least 480° C.

The PDP to which the present invention is applied is typically a plane discharge type as described above but is not limited thereto. The present invention also can be applied to an opposed discharge type. Moreover, the PDP is not limited to the AC type. The present invention also is applicable to a PDP with a dielectric layer even when the PDP is of a DC type.

The glass composition of the present invention can be used effectively not only for PDPs but also for display panels that need to be heat-treated at a high temperature of about 500° C. again after the heat treatment carried out for forming a glass layer.

The glass composition of the present invention is applicable to display panels in which electrodes covered with a dielectric layer contain at least one selected from Ag and Cu. The electrodes may contain Ag as their main component.

EXAMPLES

Hereinafter, the present invention is described further in detail using examples.

Example 1

Oxides or carbonates of various metals of at least special grade reagents were used as starting materials. These materials were weighed so that the weight ratio of the respective oxides indicated in Table 1 was obtained. They were mixed well and were then put into a platinum crucible to be melted in an electric furnace with a temperature of 900 to 1100° C. for two hours. The melt thus obtained was pressed with a brass plate to be cooled rapidly and the glass cullet was produced. This glass cullet was pulverized to be powdered with an average particle size of about 2 to 3 μm. Then, it was measured for the provisional glass transition temperature Tg*, softening point Ts, and crystallization start temperature Tx using a macro differential thermal analyzer (manufactured by Rigaku Corporation, TG8110). In this case, Tg* was a first endothermic start temperature in a DTA (Differential Thermal Analysis) curve, Ts was a second endothermic end temperature, and Tx was an exothermic start temperature after Ts.

Next, the glass cullet was re-melted, which then was poured into a mold and was annealed at a temperature of provisional glass transition temperature Tg*+40° C. for 30 minutes. Thereafter, it was cooled gradually and thus a glass block was produced. From this glass block, a 4 mm×4 mm×20 mm rod was produced by a cut process. Thereafter, it was measured for the glass transition temperature Tg and the thermal expansion coefficient α between 30° C. and 300° C. using a thermomechanical analyzer (manufactured by Rigaku Corporation, TMA8310). Furthermore, a plate with a size of 20 mm×20 mm×about 1 mm thickness was produced from the glass block through the cut process. The both surfaces thereof were subjected to mirror polishing and then gold electrodes were vapor-deposited on the surfaces. Thereafter electric capacity was measured at a frequency of 1 kHz using an impedance analyzer 4294A manufactured by Agilent Technologies, Inc., and the relative permittivity ∈ was calculated from the area and thickness of the sample.

The glass cullet was re-melted and a 20 mm×10 mm×5 mm block was produced. This block was immersed in 80° C. hot water for 24 hours. Then the volume of the block dissolved was calculated from the change in weight before and after immersion. The volume was divided by the surface area of the sample measured before immersion, and thus the thickness Δt of the block dissolved (=the amount of the block dissolved) was determined. The measurement results are shown in Table 1. In each table below, the glass transition temperature Tg, softening point Ts, and crystallization start temperature Tx are indicated with a unit of ° C., the thermal expansion coefficient α is indicated with a unit of ×$10^{-7}$/° C., and the thickness Δt is indicated with a unit of μm.

TABLE 1

| No. | Composition Ratio (wt %) | | | | | | | Properties | | | | | | |
|---|---|---|---|---|---|---|---|---|---|---|---|---|---|---|
| | $B_2O_3$ | $K_2O$ | ZnO | MgO | CaO | SrO | BaO | Tg | Ts | Tx | α | ε | Δt | E/C |
| 1 | 84.4 | 15.6 | | | | | | 365 | 502 | 617 | 81 | 5.0 | *1 | Comp. Ex. |
| 2 | 80.7 | 14.9 | 4.4 | | | | | 417 | 548 | 649 | 80 | 5.2 | 180 | Comp. Ex. |
| 3 | 70.7 | 13.0 | 16.3 | | | | | 435 | 550 | 659 | 78 | 5.6 | 90 | Comp. Ex. |
| 4 | 56.6 | 10.4 | 33.0 | | | | | 502 | 588 | 624 | 73 | 6.6 | <20 | Comp. Ex. |
| 5 | 83.5 | 15.4 | | 1.1 | | | | 385 | 520 | 674 | 82 | 5.1 | 350 | Comp. Ex. |
| 6 | 77.0 | 14.2 | | 8.8 | | | | 448 | 572 | >700 | 86 | 5.5 | 180 | Comp. Ex. |
| 7 | 83.1 | 15.4 | | | 1.5 | | | 389 | 524 | 694 | 82 | 5.1 | 390 | Comp. Ex. |
| 8 | 74.5 | 13.7 | | | 11.9 | | | 467 | 590 | >700 | 87 | 6.0 | 230 | Comp. Ex. |
| 9 | 82.0 | 15.2 | | | | 2.8 | | 388 | 524 | 692 | 82 | 5.2 | 440 | Comp. Ex. |
| 10 | 67.7 | 12.4 | | | | 19.9 | | 462 | 589 | >700 | 88 | 6.3 | 310 | Comp. Ex. |
| 11 | 80.9 | 15.0 | | | | | 4.1 | 388 | 524 | 688 | 83 | 5.2 | *1 | Comp. Ex. |
| 12 | 61.8 | 11.4 | | | | | 26.9 | 455 | 586 | >700 | 91 | 6.5 | 350 | Comp. Ex. |
| 13 | 78.3 | 14.4 | 4.3 | 3.0 | | | | 461 | 581 | >700 | 82 | 5.4 | 110 | Comp. Ex. |
| 14 | 70.0 | 12.9 | 14.3 | 2.8 | | | | 472 | 584 | >700 | 80 | 5.8 | <20 | Comp. Ex. |
| 15 | 69.3 | 12.9 | 15.0 | 2.8 | | | | 474 | 584 | >700 | 79 | 5.8 | <20 | Comp. Ex. |
| 16 | 69.2 | 12.8 | 15.2 | 2.8 | | | | 482 | 584 | >700 | 79 | 5.8 | <20 | Ex. |
| 17 | 68.4 | 12.6 | 16.2 | 2.8 | | | | 484 | 584 | >700 | 79 | 5.8 | <20 | Ex. |
| 18 | 65.4 | 12.1 | 19.8 | 2.7 | | | | 489 | 584 | >700 | 78 | 6.0 | <20 | Ex. |
| 19 | 62.0 | 11.5 | 23.9 | 2.6 | | | | 490 | 585 | >700 | 77 | 6.2 | <20 | Ex. |
| 20 | 62.0 | 7.0 | 30.0 | 1.0 | | | | 495 | 595 | >700 | 70 | 6.0 | <20 | Comp. Ex. |
| 21 | 61.0 | 6.0 | 32.0 | 1.0 | | | | 501 | 597 | >700 | 69 | 6.0 | <20 | Comp. Ex. |
| 22 | 77.5 | 6.3 | 15.2 | 1.0 | | | | 488 | 588 | >700 | 71 | 5.1 | <20 | Ex. |
| 23 | 78.0 | 5.8 | 15.2 | 1.0 | | | | 473 | 592 | >700 | 71 | 5.1 | <20 | Comp. Ex. |
| 24 | 78.5 | 5.3 | 15.2 | 1.0 | | | | 465 | 593 | >700 | 70 | 5.0 | <20 | Comp. Ex. |
| 25 | 69.6 | 12.8 | 16.2 | 1.4 | | | | 475 | 586 | 673 | 78 | 5.7 | <20 | Ex. |
| 26 | 66.2 | 12.3 | 16.0 | 5.5 | | | | 484 | 589 | >700 | 81 | 6.1 | <20 | Ex. |
| 27 | 62.0 | 11.5 | 15.7 | 10.8 | | | | 495 | 590 | >700 | 84 | 6.4 | <20 | Ex. |
| 28 | 60.5 | 11.1 | 15.6 | 12.8 | | | | 497 | 590 | >700 | 84 | 6.5 | <20 | Ex. |
| 29 | 60.0 | 11.0 | 15.6 | 13.4 | | | | 508 | 606 | >700 | 85 | 6.8 | <20 | Comp. Ex. |
| 30 | 62 | 6 | 15.2 | 16.8 | | | | 488 | 590 | >700 | 82 | 6.5 | <20 | Ex. |
| 31 | 62 | 6 | 15.0 | 17.0 | | | | 495 | 593 | >700 | 82 | 6.7 | <20 | Comp. Ex. |
| 32 | 67.3 | 12.5 | 16.3 | 4.0 | | | | 475 | 583 | >700 | 80 | 5.9 | <20 | Ex. |
| 33 | 63.3 | 11.7 | 15.3 | | | 9.7 | | 482 | 590 | >700 | 80 | 6.2 | <20 | Ex. |
| 34 | 62.0 | 9.0 | 15.2 | | | | 13.8 | 475 | 590 | >700 | 80 | 6.2 | <20 | Ex. |
| 35 | 64.2 | 11.9 | 15.5 | 1.0 | 1.3 | 2.5 | 3.7 | 477 | 587 | >700 | 81 | 6.1 | <20 | Ex. |

*1: completely dissolved

As is apparent from Table 1, Sample No. 1 formed of $B_2O_3$ and $K_2O$ alone had a very low relative permittivity ε but both the glass transition point Tg and the softening point Ts were low and the difference Ts–Tg was 137° C. Sample No. 1 had no water resistance and was dissolved completely. In Samples Nos. 2 to 12 obtained by adding ZnO, MgO, CaO, SrO, or BaO individually to Sample No. 1, both the glass transition point Tg and the softening point Ts increased with the addition, the difference Ts–Tg also became small, and the water resistance also improved.

However, in order to increase the glass transition point Tg sufficiently by addition of ZnO, it is necessary to add a large amount of ZnO. When ZnO was added in such a large amount, there was a problem in that the crystallization start temperature Tx decreased as in the case of Sample No. 4. With respect to the crystallization start temperature Tx, since a trace amount of crystals is generated at a temperature considerably lower than the exothermic peak, a small amount of crystals will be contained in the glass layer after baking to decrease the transmittance in the case where the difference between the crystallization start temperature Tx and the softening point Ts is not large. According to the studies of the inventor, a measure of this difference in temperature is at least 50° C., more desirably at least 100° C. Therefore, No. 4 had a problem practically.

In Sample Nos. 5 to 12 in which an alkaline-earth metal oxide alone had been added, although the glass transition point Tg and the softening point Ts increased in a relatively small amount and the crystallization start temperature Tx also increased, the problems remained that the difference Ts–Tg was at least 120° C. and the dissolved amount Δt exceeded 100 μm.

Next, among Sample Nos. 13 to 21 in which ZnO and an alkaline-earth metal oxide had been used together, Sample Nos. 16 to 19 in which the ZnO amount exceeded 15 wt % but was not more than 24 wt % had a relative permittivity ∈ of 6.5 or lower, a glass transition point Tg of at least 475° C., a softening point Ts of 590° C. or lower, a sufficiently high crystallization start temperature Tx, which exceeded 700° C., and a small dissolved amount Δt, specifically about 20 μm.

Accordingly, it was confirmed that it was necessary to contain ZnO and an alkaline-earth metal oxide together.

In Sample Nos. 13 to 15, each of which contained a lower amount of ZnO, the glass transition point Tg was low. On the other hand, in Sample Nos. 20 and 21, each of which contained an excessively large amount of ZnO, the softening point Ts was high.

In Sample Nos. 22 to 24, each of which contained a larger amount of $B_2O_3$, the relative permittivity ∈ was very low. However, when the amount of $B_2O_3$ was 78 wt % or more, the ratio of other components became too low and thereby it was difficult to obtain a sufficiently high glass transition point Tg. Accordingly, it was proved that the amount of $B_2O_3$ should be less than 78 wt %.

In Sample Nos. 25 to 29 in which the amount of CaO was allowed to increase, the softening point Ts was excessively high in Sample No. 29 in which the amount of $B_2O_3$ was at most 60 wt %. Similarly, in Sample Nos. 30 and 31 in which the amount of $B_2O_3$ exceeded 60 wt %, Sample No. 31 in which the amount of CaO exceeded 17 wt % had a high softening point Ts. From the above result, the amount of CaO had to be less than 17 wt %. Furthermore, the amount of $B_2O_3$ should exceed 60 wt % and was desirably at least 62 wt % especially in order to lower the relative permittivity.

In Sample Nos. 32 to 35 in which the type of alkaline-earth metal oxide was changed or four types thereof were used together, the difference was found in properties but they were usable.

Example 2

Glass cullets and glass rods each were produced in such a manner as to have the weight ratio of the respective oxides as indicated in Table 2 by the same method as in Example 1. Thereafter, the glass transition point Tg, the softening point Ts, the crystallization start temperature Tx, the thermal expansion coefficient α, the relative permittivity ∈, and the dissolved amount Δt were measured by the same method as in Example 1. The measurement results are indicated in Table 2. Since the crystallization start temperature Tx exceeded 700° C. and the dissolved amount Δt was less than 20 μm in all the samples, the result of measurements thereof was not indicated but omitted.

TABLE 2

| | Composition Ratio (wt %) | | | | | | | Properties | | | | |
|---|---|---|---|---|---|---|---|---|---|---|---|---|
| No. | $B_2O_3$ | $Li_2O$ | $Na_2O$ | $K_2O$ | ZnO | CaO | $SiO_2$ | Tg | Ts | α | ε | E/C |
| 41 | 75.4 | | | 4.8 | 17.8 | 2.0 | | 455 | 593 | 70 | 5.2 | Comp. Ex. |
| 42 | 73.2 | | | 7.1 | 17.7 | 2.0 | | 475 | 589 | 72 | 5.4 | Ex. |
| 43 | 68.8 | | | 11.7 | 17.5 | 2.0 | | 485 | 583 | 77 | 5.8 | Ex. |
| 44 | 64.7 | | | 16.0 | 17.4 | 1.9 | | 481 | 577 | 82 | 6.2 | Ex. |
| 45 | 62.5 | | | 18.4 | 17.2 | 1.9 | | 476 | 573 | 85 | 6.6 | Comp. Ex. |
| 46 | 61.5 | | | 20.7 | 17.2 | 0.5 | | 473 | 569 | 87 | 6.7 | Comp. Ex. |
| 47 | 75.0 | | 4.8 | | 18.1 | 2.1 | | 473 | 586 | 67 | 5.4 | Comp. Ex. |
| 48 | 66.7 | | 12.9 | | 18.3 | 2.1 | | 476 | 575 | 70 | 6.3 | Ex. |
| 49 | 76.9 | 2.4 | | | 18.5 | 2.2 | | 474 | 583 | 65 | 5.5 | Comp. Ex. |
| 50 | 71.5 | 6.7 | | | 19.5 | 2.3 | | 476 | 567 | 64 | 6.4 | Ex. |
| 51 | 70.0 | 1.6 | 3.2 | 4.9 | 18.2 | 2.1 | | 476 | 573 | 71 | 6.0 | Ex. |
| 52 | 72.0 | 0.8 | | 7.2 | 17.9 | 2.1 | | 482 | 584 | 72 | 5.6 | Ex. |
| 53 | 67.1 | 0.8 | | 7.1 | 15.5 | 2.0 | 7.5 | 485 | 588 | 72 | 5.6 | Ex. |
| 54 | 65.2 | 0.8 | | 6.5 | 15.5 | 2.0 | 10.0 | 485 | 588 | 70 | 5.6 | Ex. |
| 55 | 62.0 | 0.7 | | 5.7 | 15.1 | 1.9 | 14.6 | 485 | 589 | 69 | 5.5 | Comp. Ex. |
| 56 | 62.0 | 0.7 | | 5.7 | 15.1 | 1.5 | 15.0 | 485 | 590 | 69 | 5.5 | Comp. Ex. |
| 57 | 61.1 | 0.7 | | 5.7 | 13.5 | 1.5 | 17.5 | 489 | 604 | 69 | 5.4 | Comp. Ex. |
| 58 | 60.8 | 0.7 | | 4.6 | 13.1 | 0.6 | 20.3 | 496 | 607 | 67 | 5.2 | Comp. Ex. |

In Sample Nos. 41 to 46 in which the amount of $K_2O$ was increased gradually while the amount of $B_2O_3$ was reduced gradually, the glass transition point Tg was low and the softening point Ts was excessively high when a small amount of $K_2O$ was contained, while the relative permittivity ∈ was high when a larger amount of $K_2O$ was contained.

In Sample Nos. 47 to 51 in which $K_2O$ was replaced by $Na_2O$ or $Li_2O$, or they were used together, good properties were obtained when the amount of $R_2O$ was from 6 wt % to 16 wt % as in Sample Nos. 48, 50, and 51. However, as is apparent from the comparisons between Sample Nos. 43 and 48 as well as between Sample Nos. 42 an 50, when the alkali metal oxides were compared to one another in the comparable amount, it was found that $K_2O$ provided the highest thermal expansion coefficient, followed by $Na_2O$ and $Li_2O$ in this order. When the amount of alkali metal oxides increases, yellowing tends to occur. Therefore it is desirable to reduce the amount as much as possible. From the result of this example, it can be judged that when it is intended to obtain a thermal expansion coefficient of a value above a certain level, $K_2O$ allows it to be obtained in the smallest amount, and $Na_2O$ and $Li_2O$ are required to be used in increased amounts in this order. Even when $K_2O$, $Na_2O$, and $Li_2O$ are added in the same amounts, the degrees of yellowing that occurred thereby are different from each other. When comparisons are made in the same amount thereof to be added, the highest degree of yellowing occurs in the case of using $Li_2O$, the degree decreases in the case of using $Na_2O$ and $K_2O$ sequentially. Thus, it was confirmed that among the alkali metal oxides, $K_2O$ was most preferable, $Na_2O$ was next preferable, and $Li_2O$ was less preferable. It was most preferable that $K_2O$ alone was used as the alkali metal oxide or $K_2O$ was used together with $Na_2O$ in an amount that was twice the amount of $Na_2O$.

In Sample Nos. 52 to 58 in which the amount of $SiO_2$ was allowed to increase gradually with respect to other components, the softening point Ts increased with the increase in the amount of $SiO_2$ and exceeded 590° C. when the amount of $SiO_2$ added exceeded 15 wt %. In addition, the thermal expansion coefficient α was lower than $70 \times 10^{-7}/°$ C. when the amount of $SiO_2$ added exceeded 10 wt %. Therefore, it was confirmed that the amount of $SiO_2$ should be 10 wt % or less.

The inventor also studied various combinations of compositions other than those indicated above in Examples 1 and 2. However, in every case, it was possible to obtain glass with good properties, i.e. a relative permittivity of 6.5 or lower, a glass transition point of at least 475° C., a softening point of 590° C. or lower, a thermal expansion coefficient of $70 \times 10^{-7}$ to $90 \times 10^{-7}/°$ C., and the dissolved thickness (=the dissolved amount Δt) of 100 μm or less by adjusting the composition in the following ranges: the amount of $B_2O_3$ exceeded 60 wt % but less than 78 wt %, the amount of alkali metal oxides was from 6 wt % to 16 wt %, the amount of alkaline-earth metal oxides was at least 1 wt % but less than 17 wt %, the amount of $SiO_2$ was from 0 wt % to 10 wt %, and the amount of ZnO exceeded 15 wt % but not more than 24 wt %.

Example 3

In Example 3, a PDP was produced that had the same configuration as that of the PDP shown in FIG. 1.

By the same method as in Example 1, powders of various raw materials were mixed so that the weight ratio of the respective oxides was as follows: $B_2O_3:K_2O:CaO:ZnO=70.1:11.8:2.8:15.3$. The mixture then was put into a platinum crucible. This was melted in an electric furnace at 1050° C. for 5 hours. Thereafter, the glass cullet was produced by the twin roller method. This glass cullet was pulverized by a dry type ball mill to produce powder. The glass powder thus obtained had an average particle size of about 5 μm. The glass obtained in this example had a relative permittivity of 5.7, a glass transition point of 485° C., a softening point of 582° C., and a thermal expansion coefficient of $72 \times 10^{-7}/°$ C.

Ethyl cellulose and alpha-terpineol were added to the glass powder as a binder and a solvent, respectively. They were mixed together with a three roll mill, and thereby a glass paste was obtained.

Next, a material of ITO (transparent electrode) was applied in a predetermined pattern on the surface of a flat front glass substrate made of soda lime glass with a thickness of about 2.8 mm, and was then dried. Subsequently, a silver paste, which was a mixture of silver powder and organic vehicle, was applied in the form of a plurality of lines. Thereafter the whole front glass substrate was heated and thereby the silver paste was baked to form display electrodes.

The glass paste of this example described above was applied to the front glass substrate on which the display electrodes bad been produced, using the blade coater method. Thereafter, the whole front glass substrate was maintained at 90° C. for 30 minutes and thereby the glass paste was dried. It was then baked at a temperature of 585° C. for 10 minutes. Thus, a dielectric layer with a thickness of about 30 μm was formed.

Magnesium oxide (MgO) was vapor-deposited on the above-described dielectric layer by the electron beam vapor deposition method. Thereafter, it was baked at 500° C. and thereby a dielectric protective layer was formed.

The front panel was produced by the method as described above.

On the other hand, the rear panel was produced by the following method.

First, address electrodes composed mainly of silver were formed in the form of stripes on a rear glass substrate made of soda lime glass, by the screen printing. Subsequently, a dielectric layer with a thickness of about 8 μm was formed by the same method as that used for forming the front panel.

Next, a glass paste was used to form barrier ribs between adjacent address electrodes on the dielectric layer. The barrier ribs were formed by repeating the screen printing and baking.

Subsequently, phosphor pastes of red (R), green (G), and blue (B) were applied to the wall surfaces of the barrier ribs and the surface of the dielectric layer exposed between the barrier ribs, and were then dried and baked to produce phosphor layers. The materials mentioned above were used for the phosphors.

The front panel and rear panel produced above were bonded to each other at 500° C. using a Bi—Zn—B—Si—O sealing glass. After the insides of the discharge spaces were evacuated to a high vacuum (about $1 \times 10^{-4}$ Pa), Ne—Xe discharge gas was sealed at a predetermined pressure. Thus, a PDP was produced.

It was confirmed that the panel thus produced did not particularly cause any defects in the dielectric layer but operated without any problems.

Example 4

In Example 4, a PDP with a dielectric layer having a two-layer structure as shown in FIG. 3 was produced.

A B—K—Ca—Zn—O glass paste was prepared for the second dielectric layer by the same method as in Example 3. Separately, a Bi—Zn—B—Ca—Si—O glass paste that contained Bi, was substantially free from alkali metal elements, and had a relative permittivity of 11 and a softening point of 587° C. also was prepared for the first dielectric layer.

Using these pastes, a PDP panel was produced by the same method as in Example 3, in which the dielectric layer of the front panel had a two-layer structure including a first dielectric layer that directly covered electrodes and a second dielectric layer formed on the first dielectric layer. The first dielectric layer was baked at 590° C. to have a thickness of about 10 μm and the second dielectric layer was baked at 580° C. to have a thickness of about 20 μm.

It was confirmed that the panel thus produced did not particularly cause any defects in the dielectric layer but operated without any problems.

The glass composition of the present invention is suitably applicable to form insulating coating glass for electrodes, particularly dielectric layers for covering display electrodes and address electrodes of plasma display panels.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A display panel comprising a dielectric layer that contains a glass composition and covers an electrode, wherein the glass composition is an oxide glass composition, having a composition satisfying:

60 wt %<$B_2O_3$<78 wt %, 15 wt %≦ZnO≦24 wt %, 6 wt %≦$R_2O$≦16 wt %

1 wt %≦MO<17 wt %, and 0 wt %≦$SiO_2$≦10 wt %, where R denotes at least one selected from Li, Na, and K, and M indicates at least one selected from Mg, Ca, Sr, and Ba, wherein the class composition has a softening point of 590° C. or lower, a glass transition point of at least 475° C. a thermal expansion coefficient of 60×$10^{-7}$/° C. to 90×$10^{-7}$/° C., and a relative permittivity of 6.5 or lower.

2. The display panel according to claim 1, wherein the electrode contains at least one selected from silver (Ag) and copper (Cu).

3. A display panel comprising a dielectric layer that contains a glass composition and covers an electrode, wherein the dielectric layer includes a first dielectric layer that directly covers the electrode and a second dielectric layer that is disposed on the first dielectric layer, and a glass composition contained in the first dielectric layer is substantially free from an alkali metal element, and a glass composition contained in the second dielectric layer is an oxide glass composition, having a composition satisfying:

60 wt %<$B_2O_3$<78 wt %, 15 wt %≦ZnO≦24 wt %, 6 wt %≦$R_2O$≦16 wt %, 1 wt %≦MO<17 wt %, and 0 wt %≦$SiO_2$≦10 wt %, where R denotes at least one selected from Li, Na, and K, and M indicates at least one selected from Mg, Ca, Sr, and Ba, wherein the glass composition has a softening point of 590° C. or lower, a glass transition point of at least 475° C., a thermal expansion coefficient of 60×$10^{-7}$/° C. to 90×$10^{-7}$/° C., and a relative permittivity of 6.5 or lower.

4. The display panel according to claim 3, wherein the electrode contains at least one selected from silver (Ag) and copper (Cu).

5. A plasma display panel comprising:

a front panel provided with a first electrode, a rear panel that is provided with a second electrode, with the second electrode crossing the first electrode, and that is disposed opposing the front panel, a dielectric layer that covers at least one selected from the first electrode and the second electrode, and barrier ribs disposed between the front panel and the rear panel to form a discharge space, wherein the dielectric layer contains an oxide glass composition, having a composition satisfying:

60 wt %<$B_2O_3$<78 wt %, 15 wt %≦ZnO≦24 wt %, 6 wt %≦$R_2O$≦16 wt %

1 wt %≦MO<17 wt %, and 0 wt %≦$SiO_2$≦10 wt %, where R denotes at least one selected from Li, Na, and K, and M indicates at least one selected from Mg, Ca, Sr, and Ba.

wherein the glass composition has a softening point of 590° C. or lower, a glass transition point of at least 475° C., a thermal expansion coefficient of 60×$10^{-7}$/° C. to 90×$10^{-7}$/° C., and a relative permittivity of 6.5 or lower.

6. The display panel according to claim 5, wherein the electrode that is covered with the dielectric layer contains at least one selected from silver (Ag) and copper (Cu).

7. A display panel comprising:

a first dielectric layer disposed on a substrate, an electrode disposed on the first dielectric layer, and a second dielectric layer disposed on the electrode, wherein the first dielectric layer contains an oxide glass composition, having a composition satisfying:

60 wt %<$B_2O_3$<78 wt %, 15 wt %≦ZnO≦24 wt %, 6 wt %≦$R_2O$≦16 wt %, 1 wt %≦MO<17 wt %, and 0 wt %≦$SiO_2$≦10 wt %, where R denotes at least one selected from Li, Na, and K, and M indicates at least one selected from Mg, Ca, Sr, and Ba, wherein the glass composition has a softening point of 590° C. or lower, a glass transition point of at least 475° C. a thermal expansion coefficient of 60×$10^{-7}$/° C. to 90×$10^{-7}$/° C., and a relative permittivity of 6.5 or lower.

8. The display panel according to claim 7, wherein the electrode contains at least one selected from silver (Ag) and copper (Cu).

* * * * *

UNITED STATES PATENT AND TRADEMARK OFFICE
CERTIFICATE OF CORRECTION

| | | |
|---|---|---|
| PATENT NO. | : 7,839,088 B2 | Page 1 of 1 |
| APPLICATION NO. | : 11/858598 | |
| DATED | : November 23, 2010 | |
| INVENTOR(S) | : Inoue et al. | |

It is certified that error appears in the above-identified patent and that said Letters Patent is hereby corrected as shown below:

Column 19, line 9 (claim 1): "15 wt %≦ZnO≦24 wt %" should read --15 wt %<ZnO≦24 wt %--.

Column 19, line 11: "6 wt %≦R2O≦16 wt %" should read --6 wt %≦R2O≦16 wt %,--.
Column 19, line 18 (claim 1): "class" should read --glass--.
Column 19, lines 18-19: (claim 1): "590° C." should read -- 590°C --.
Column 19, line 19 (claim 1): "475° C." should read -- 475°C, --.
Column 19, line 20 (claim 1): "60x10$^{-7}$/° C." should read -- 60 x 10$^{-7}$/°C--.
Column 19, line 20-21(claim 1): "90x10$^{-7}$/°C.," should read -- 90 x 10$^{-7}$/°C, --.

Column 19, line 39 (claim 3): "15 wt %≦ZnO≦24 wt %" should read -- 15 wt %<ZnO≦24 wt % --.
Column 19, lines 48-49 (claim 3): "590° C." should read -- 590°C --.
Column 19, line 49 (claim 3): "475° C.," should read -- 475°C, --.
Column 19, line 50(claim 3): "60x10$^{-7}$/° C." should read -- 60 x 10$^{-7}$/°C --.
Column 19, line 50-51(claim 3): "90x10$^{-7}$/° C.," should read -- 90 x 10$^{-7}$/°C, --.

Column 20, line 14 (claim 5): "15 wt %≦ZnO≦24 wt %" should read --15 wt %<ZnO≦24 wt % --.

Column 20, line 16: "6 wt %≦R2O≦16 wt %" should read -- 6 wt %≦R2O≦16 wt %, --.
Column 20, line 23 (claim 5): "590° C." should read -- 590°C --.
Column 20, line 24 (claim 5): "475° C.," should read -- 475°C, --.
Column 20, line 25 (claim 5): "60x10$^{-7}$/° C." should read -- 60 x 10$^{-7}$/°C --.
Column 20, line 25-26 (claim 5): "90x10$^{-7}$/° C.," should read -- 90 x 10$^{-7}$/°C, --.

Column 20, line 38 (claim 7): "15 wt %≦ZnO≦24 wt %" should read -- 15 wt %<ZnO≦24 wt % --.
Column 20, line 46-47 (claim 7): "590° C." should read -- 590°C --.
Column 20, line 47 (claim 7): "475° C.," should read -- 475°C, --.
Column 20, line 48 (claim 7): "60x10$^{-7}$/° C." should read -- 60 x 10$^{-7}$/°C --.
Column 20, line 48-49 (claim 7): "90x10$^{-7}$/° C.," should read -- 90 x 10$^{-7}$/°C, --.

Signed and Sealed this
Fifth Day of July, 2011

David J. Kappos
*Director of the United States Patent and Trademark Office*